United States Patent [19]
Chapin et al.

[11] Patent Number: 5,684,910
[45] Date of Patent: Nov. 4, 1997

[54] BUFFERED OPTICAL FIBER HAVING A STRIPPABLE BUFFER LAYER

[75] Inventors: John Thomas Chapin, Alpharetta; Lionell Graham, Snellville; James Robert Holman, Lilburn; Montri Viriyayuthakorn, Norcross, all of Ga.

[73] Assignee: Lucent Technologies Inc., Murray Hill, N.J.

[21] Appl. No.: 669,119

[22] Filed: Jun. 24, 1996

[51] Int. Cl.$^6$ .................. G02B 6/02; G02B 6/22
[52] U.S. Cl. ............................................. 385/128
[58] Field of Search .......................... 385/128, 123, 385/109; 174/76

[56] References Cited

U.S. PATENT DOCUMENTS

| | | | |
|---|---|---|---|
| 3,864,018 | 2/1975 | Miller | 350/96 |
| 4,072,400 | 2/1978 | Claypoole et al. | 385/128 |
| 4,114,981 | 9/1978 | Ishida et al. | 385/128 |
| 4,305,642 | 12/1981 | Bloodworth et al. | 350/96.2 |
| 4,334,733 | 6/1982 | Takeshima et al. | 385/128 |
| 4,344,669 | 8/1982 | Uchida et al. | 385/128 |
| 4,474,830 | 10/1984 | Taylor | 427/54.1 |
| 4,512,630 | 4/1985 | Runge | 350/96.21 |
| 4,687,293 | 8/1987 | Randazzo | 385/128 |
| 4,850,670 | 7/1989 | Mathis et al. | 350/96.21 |
| 4,896,938 | 1/1990 | Mathis et al. | 350/96.21 |
| 4,934,785 | 6/1990 | Mathis et al. | 350/96.21 |
| 4,962,996 | 10/1990 | Cuellar et al. | 385/128 |
| 5,011,260 | 4/1991 | Marx et al. | 350/96.23 |
| 5,129,023 | 7/1992 | Anderson et al. | 385/70 |
| 5,181,268 | 1/1993 | Chein | 385/128 |

OTHER PUBLICATIONS

"Measurements of Strip Force Required for Mechanically Removing Coatings from Optical Fibers" EIA/TIA–455–178, Nov. 11, 1990.

Ethylene–Ethyl Acrylate Copolymer DPDA–9169 Natural, Union Carbide Chemicals and Plastics Company Inc., Polyolefins Division, pp. 73–108.

Material Safety Data Sheet, POD MSDS: 010–08, Product: DPDA–9169 NT, Union Carbide Corporation, May 17, 1995.

*Primary Examiner*—Akm E. Ullah
*Attorney, Agent, or Firm*—Donald E. Hayes, Jr.

[57] ABSTRACT

A buffered optical fiber (20) includes an optical fiber (21) comprising a core and a cladding. Typically, the optical fiber is enclosed by at least one layer (23) of coating material. The optical fiber is enclosed by a plastic buffer layer (30). Interposed between the optical fiber and the buffer layer is a boundary layer (40). Importantly, the boundary layer of the present invention is a low modulus material applied as a substantially thick layer relative to the buffer layer. In a preferred embodiment, the wall thickness of the boundary layer is about one-forth to one-third the wall thickness of the buffer layer. However, depending on the particular materials selected for the buffer and boundary layer, the wall thickness of the boundary layer can be as thin as one-twenty-fifth ($\frac{1}{25}$) of the buffer layer. As a result of the present design, there is sufficient adhesion between the buffer layer and the underlying coating material to maintain the buffer layer in place during normal use of the buffered optical fiber. On the other hand, the adhesion is low enough so that the buffer layer may be removed upon the application of reasonably low mechanical stripping forces. Advantageously, the boundary layer also allows the selective removal of the optical fiber coating material as well as the plastic buffer layer.

15 Claims, 3 Drawing Sheets

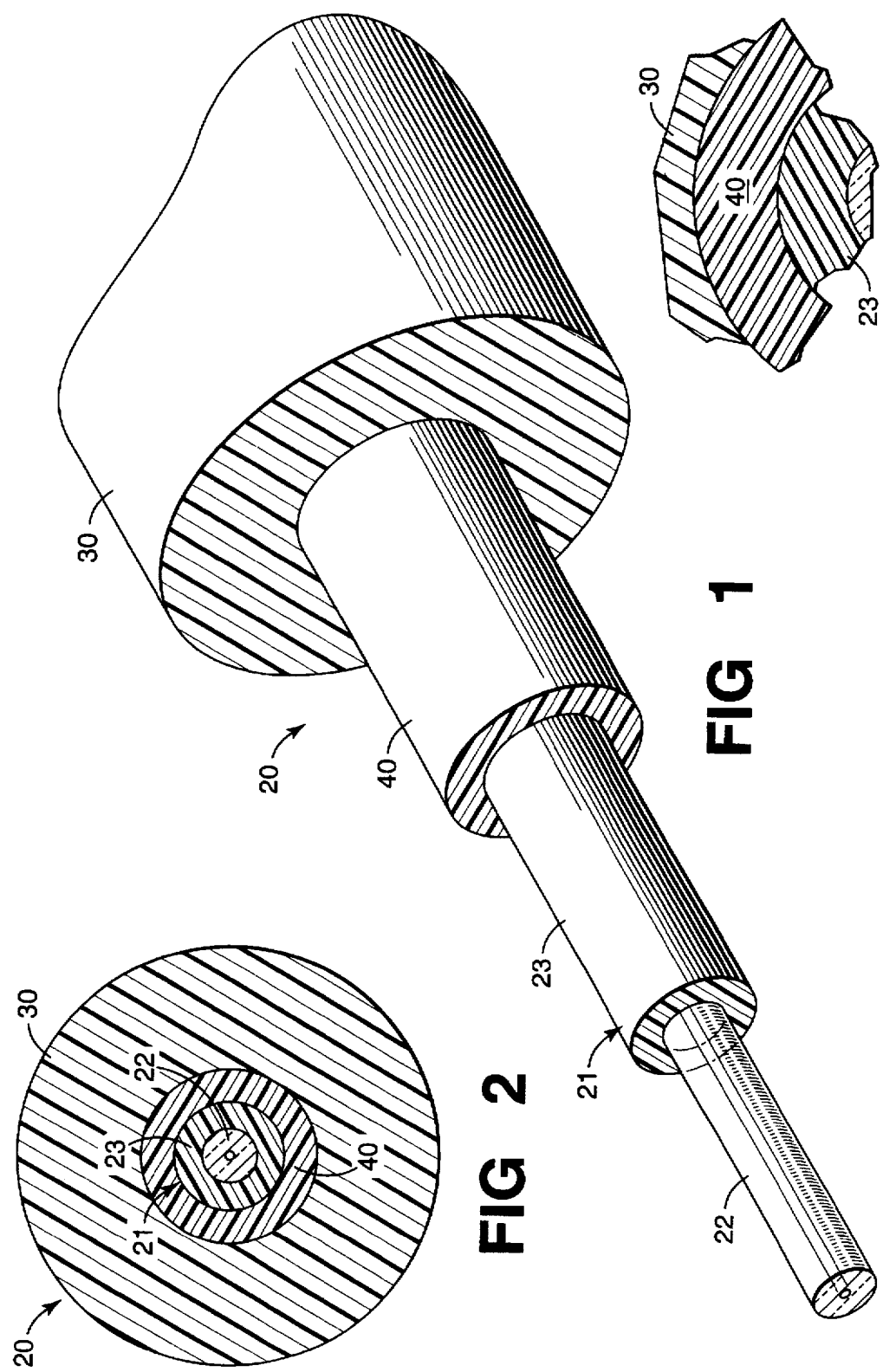

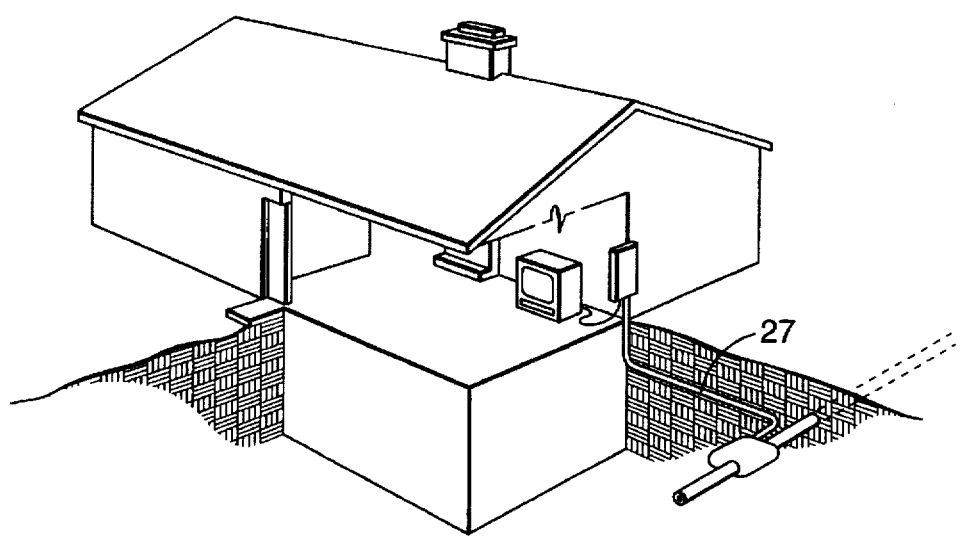
FIG 4
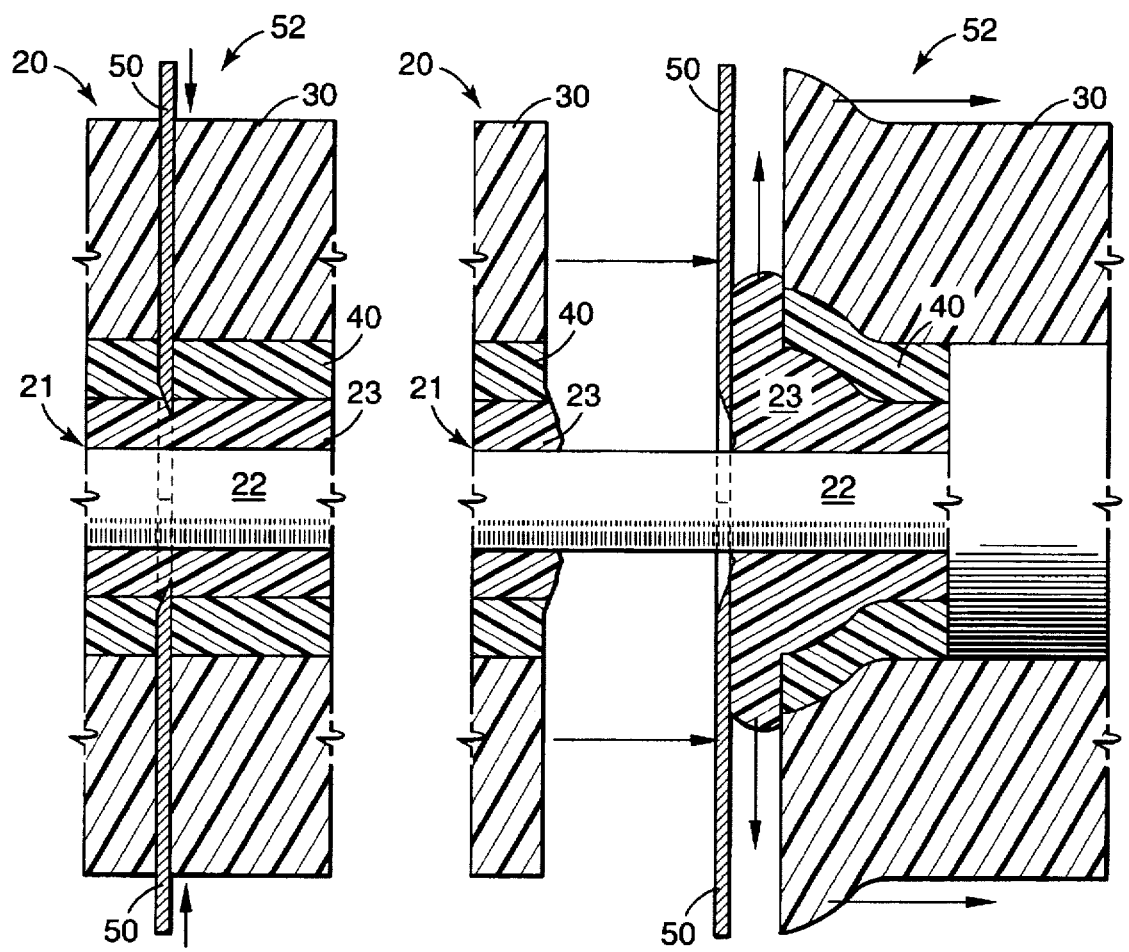
FIG 6  FIG 7

BUFFERED OPTICAL FIBER HAVING A STRIPPABLE BUFFER LAYER

TECHNICAL FIELD

This invention relates to a buffered optical fiber having enhanced mechanical strippability. More particularly, the invention relates to a buffered optical fiber having a boundary layer between the outermost coating layer on the optical fiber and the layer of buffer material.

BACKGROUND OF THE INVENTION

Optical fiber now is in widespread use as communication media. Typically, an optical fiber includes a glassy core which may have a diameter on the order of 8 µm for single mode transmission, or about 62.5 µm for multimode transmission, and a cladding. About the cladding is disposed one or more layers of a coating material. The coating material or materials is used to protect the optical fiber. When an optical fiber is terminated by a ferrule for example, it often becomes necessary to remove the coating material(s) from an end portion of the optical fiber.

An optical fiber cable includes a sheath system which extends along the longitudinal axis of the cable and helps protect the optical fibers inside the cable. Not only does the sheath system protect the glass fibers themselves, but also it provides the cable with flexibility and with suitable tensile, flexural and impact strength. For multi-fiber cables, the sheath system may include several extruded layers of plastic as well as one or more metallic shields disposed between elements of the sheath system.

Optical fibers of a cable may be terminated in any one of several ways. Each fiber may be terminated by a connector widely known as a biconic connector. Such a connector is disclosed in U.S. Pat. No. 4,512,630 which issued on Apr. 23, 1985 in the name of P. K. Runge. Another connector is one referred to as an ST® connector, ST® being a registered trademark of AT&T. See U.S. Pat. Nos. 4,850,670, 4,896, 938, 4,934,785 and U.S. Pat. No. 5,129,023. Additionally, it should be understood that the present invention is also suitable for use with many other types of optical fiber connectors such as the FC® and/or SC®, as well as being useable in an array connector which terminates a planar array of optical fibers between two chips.

Single fiber cables also are well known in the art. They also may be terminated with biconic connector plugs or ST® connectors. Generally, a single fiber cable includes a coated optical fiber which is further enclosed in a buffer layer. The buffer layer typically is made of a plastic material which is extruded immediately over the coated optical fiber. In practice, the desired application and operational requirements determine the specific material selected for use as the buffer layer. However, commonly used buffer materials include polyvinyl chloride and nylon. Throughout the industry, such a single optical fiber cable generally is referred to as a buffered optical fiber. In alternative cabling embodiments, a yarn which provides strength for the cable may be disposed over the buffer layer. The yarn may be an aramid fibrous yarn and is usually positioned in a helical fashion about an advancing buffered optical fiber. An outer jacket generally is extruded about the yarn.

Buffered optical fibers are used, for example, in central offices to connect cables to optical transmission apparatus. Also, buffered optical fibers may be used widely inside buildings. For example, buffered optical fibers may be used in riser cables which interconnect cables entering building equipment rooms to wiring closets on upper floors. Further, buffered optical fibers may be used in plenums which extend from the riser closets on each floor to satellite closets or directly to equipment and for connecting the equipment to plenum cables. In general, buffered optical fibers are used for fiber-to-the-home (FTTD) applications.

A still further use of buffered optical fibers is in the local area network. Therein, distribution cables extend from distribution cabinetry to drop closures and thence to terminal locations. Buffered fibers appear to be the choice for inclusion in those cables which extend from distribution cabinetry to each home, for example.

It has been found that existing buffered fiber cables are somewhat difficult to mechanically strip for connectorization. That is, difficulties have been encountered in the removal of the buffer layer from the coated optical fiber. This is particularly true in those instances where it is desired to expose a substantial length of optical fiber (either with or without the coating layers) for particular connectorization arrangements.

The prior art discloses the use of a release agent for buffered optical fiber. In U.S. Pat. No. 4,072,400, a buffered optical waveguide fiber includes an optical waveguide fiber which is coated with a glass protective coating with a release agent coating applied over the glass protective coating. As a buffer, a protective layer of a thermoplastic synthetic resinous material is disposed over the release agent. As disclosed in the aforementioned U.S. Pat. No. 4,072,400, the release agent material may be any suitable lubricant such as silicone oil, petroleum lubricant, a layer of colloidal graphite, talc or the like. A second design in the prior art is set forth in U.S. Pat. No. 5,011,260. This '260 patent discloses the use of a thin layer (0.3 µm to 0.5 µm) of decoupling material interposed between the optical fiber and the buffer layer. In the preferred embodiment of the '260 reference, the disclosed decoupling material is a composition which comprises an acrylate copolymer material available commercially as MODAFLOW® resin modifier from Monsanto Company.

Presently, when it is desired to remove the buffer layer, a mechanical stripping tool including opposed knife blades is manipulated to cause the blades to cut through the buffer layer. Afterwards, forces are applied to the tool to cause the buffer layer to be pulled from the optical fiber. However, because of the adhesion of the buffer layer to the coating material, the forces required to remove the buffer layer may cause the fiber to break, particularly when trying to remove about one inch of the buffer layer to expose sufficient optical fiber for termination purposes. Once the fiber is broken, the craftsperson must begin the process anew.

One technique of overcoming this problem has been to remove the one inch length of buffering in incremental steps of one-sixteenth inch each, for example. As should be apparent, this is a time consuming procedure and alternatives have been sought after.

Another problem relates to the removal of the buffer layer and the underlying coating material from the optical fiber in a single operation. The use of certain types of optical fiber connector designs generate instances when not only is it desired to remove not only a length of the buffer layer from the underlying coated optical fiber but also the coating layer or layers as well, thereby leaving only the glass optical fiber itself exposed. In fact in some installations, it becomes necessary to remove both the buffer layer and the coating layer or layers from a length of the underlying optical fiber and then to remove only the buffer layer from an adjacent portion of the buffered optical fiber. As should be apparent, the buffered optical fiber which is sought after must include provisions to facilitate the removal of the buffer layer or both the buffer layer and the coating materials from the optical fiber.

Of course, although the sought-after cable must be one in which the buffer layer, or the buffer layer and the coating material, must be able to be removed somewhat easily, the cable must also have other properties. For example, there must be sufficient adhesion between the buffer layer and the underlying coating material to maintain the buffer layer in place during normal use as well as to permit stripping the buffer and coating(s) down to the glass without damaging, i.e. scratching, the glass.

SUMMARY OF THE INVENTION

The foregoing problems of the prior art have been overcome with the buffered optical fiber of this invention. A buffered optical fiber of this invention includes a core comprising an optical fiber which is enclosed in at least one layer of coating material and a layer of a plastic buffering material which encloses the coated optical fiber. In accordance with the present invention, a unique boundary layer is disposed between the outermost coating layer and the buffer material. Importantly, the boundary layer of the present invention is a low modulus material applied as a substantially thick layer relative to the buffer layer. In a preferred embodiment, the wall thickness of the boundary layer is about one-forth to one-third the wall thickness of the buffer layer. However, depending on the particular materials selected for the buffer and boundary layer, the wall thickness of the boundary layer can be as thin as one-twenty-fifth (1/25) of the buffer layer.

The boundary layer is such that it facilitates relative longitudinal motion between the coating material and the buffer layer upon the application of suitable mechanical stripping forces. However, during normal use of the optical fiber, the boundary layer is such that there is sufficient adhesion between the plastic buffering material and the fiber coating material to cause the plastic buffering material to be maintained in place. Also, the boundary layer is such that there is insignificant migration of any of the boundary layer into the coating on the optical fiber or into the plastic buffering material.

As a result of the inclusion of the boundary layer, the buffering layer and the boundary layer may be removed in a manner that leaves an undamaged coated optical fiber. Further, the boundary layer is such that if blade depth of a stripping tool are adjusted, a reasonable length of the coating material as well as of the overlying buffering material and boundary layer may be removed together in a single operation, thereby exposing only the glass optical fiber itself.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of a buffered optical fiber of this invention;

FIG. 2 is an end cross sectional view of the buffered optical fiber of FIG. 1;

FIG. 4 is a schematic view of a cable extending to a customer's home, the cable including buffered optical fibers of this invention;

FIG. 5 is a detail view of a portion of the buffered optical fiber of FIG. 1;

FIG. 6 is an enlarged view of a portion of the buffered optical fiber of FIG. 1 with blades of a stripping tool in position for a mechanical stripping operation; and FIG. 7 is an enlarged view of the portion of the buffered optical fiber of FIG. 6 after the blades have been moved to remove a buffer layer and coating material from an end portion.

DETAILED DESCRIPTION

Figure 3:
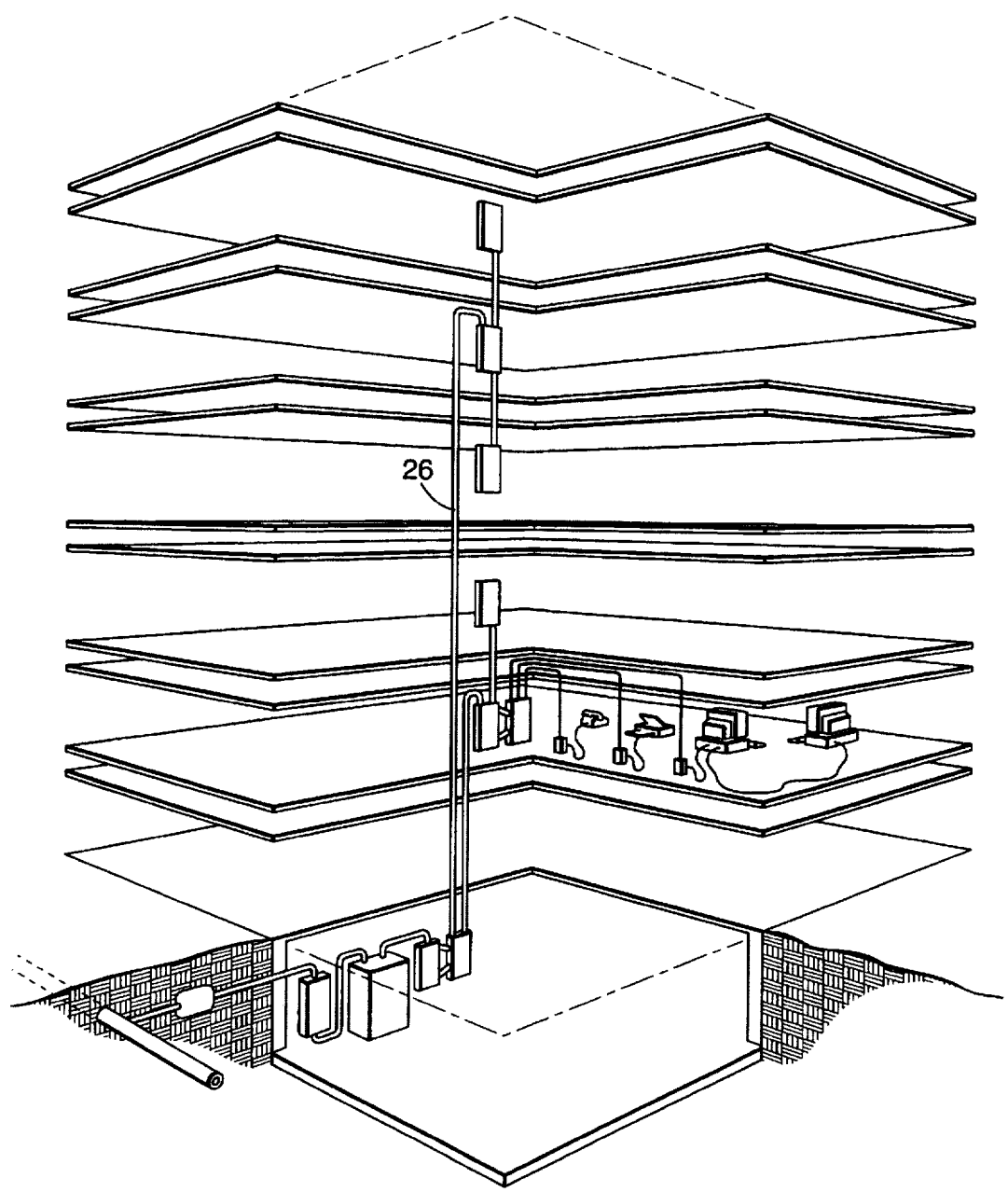
FIG. 3 is a schematic view of a building to show a use of the buffered optical fiber of this invention.

Referring now to FIGS. 1 and 2, there is shown a buffered optical fiber 20 of this invention. The buffered optical fiber, generally depicted as element 20, includes a coated optical fiber, generally depicted as element 21, which typically includes a core and cladding designated together by the numeral 22 and at least one layer of a protective coating 23 about the core and cladding. Of course, the coated optical fiber 21 may include more than one protective coating. See U.S. Pat. No. 4,474,830 which issued on Oct. 2, 1984, in the name of C. R. Taylor.

As can be seen in FIGS. 1 and 2, the buffered fiber 20 also includes a jacket 30 which is referred to as a buffer layer. The buffer layer 30 is made of a plastic material such as nylon or polyvinyl chloride. In the preferred embodiment, the buffer layer 30 has a wall thickness in the range of about 0.008 to 0.014 inch (200 µm to 350 µm). In accordance with the present invention, an additional boundary layer 40 is positioned between the coated optical fiber 21 and the buffer layer 30. In the preferred embodiment, the boundary layer 40 is made of a material having a relatively low modulus, i.e. less than about 15,000 psi at 23° C. (Secant Modulus), and has a wall thickness in the range of about 0.002 to 0.004 inch (50 µm to 100 µm).

However, it should be noted that the exact amount of material used as the boundary layer 40 may vary depending on the particular characteristics of the material selected for the buffer layer 30. More specifically, the harder the material selected for the buffer layer 30, the thicker the boundary layer may be in accordance with the present invention. In fact, when certain materials are selected for the buffer material that are stiffer type materials, such as low-smoke poly (vinyl-chloride) (LSPVC) and fire-retardant polypropylene (FRPP), then the boundary layer 40 can have a wall thickness as low as about 0.0005 inches (12.7 µm).

Broadly speaking, this invention is directed to a novel design for a buffered optical fiber. Some exemplary applications that the cable design of the present invention may be used in include a riser cable 26 (see FIG. 3) and a cable 27 for directly servicing the home (see FIG. 4). However, it should be noted that while these particular applications are selected for illustration herein, the cable of the present invention provides enhancements for other communication cable applications as well. More specifically, among some of the other communication environments this cable design is suitable for include non-halogen riser plenum markets and cordage also.

Due to the introduction of the new boundary layer 40 of the present invention, there is enhanced mechanical strippability of the buffer layer 30 or of the buffer layer and the underlying optical fiber coating material. Not only is the buffering layer and, if desired, the coating material, easily removable, but they are easily removable without inflicting damage to the optical fiber. On the other hand, suitable adhesion exists between the buffer layer 30 and the underlying coating material to maintain the buffer layer in place during normal expected handling and use of the buffered optical fiber 20.

Optical fibers must be stripped of the buffering layer 30 and in many instances of their coating materials to facilitate connectorization. In some instances, it is desirable to provide a transition between optical fiber cables and optical fiber ribbons. In this procedure, as disclosed in U.S. Pat. No. 4,305,642, which issued on Dec. 15, 1981 in the names of L. B. Bloodworth, Jr., et at., a substantial length of the covering of the cable is removed to expose buffered optical fibers, for example. This is done in order to be able to position a plurality of optical fibers on a tape and to enclose them in a second tape to form a ribbon and allow connectorization with an array type connector such as is shown in U.S. Pat. No. 3,864,018 which issued on Feb. 4, 1975, in the name of C. M. Miller.

The strippability of a reasonable length of the buffer layer 30 and the underlying optical fiber coating or coatings in a single operation for termination purposes, for example, is provided by interposing a boundary layer 40 between the coated optical fiber and the jacket (see FIGS. 1, 2 and 5). Such a boundary layer should be one which facilitates the removal of a reasonable length of the buffer layer or buffer layer and coating material in one operation without causing damage to the optical fiber in the process of doing so.

At present, the industry has established guidelines for the desired strippability characteristics for optical fibers which are set forth in EIA/TIA-455-178 entitled "Measurements of Strip Force Required for Mechanically Removing Coatings from Optical Fibers." For distribution cables, the force required to mechanically remove at least 0.6 in. (15 μmm) of the aged or unaged 900 micron buffer from the 250 micron protective coating intact does not exceed 13.2N (3 lbs force). Unfortunately, many of the existing buffered optical fiber designs are not reliably capable of meeting these mechanical strippability requirements as established. While some of the softer buffer materials such as PVC may satisfy the strippability requirements, it is important to note that when stiffer buffer materials are used, such as in applications with certain optical fiber connector designs, i.e. ST, the strippability requirements are rarely satisfied. The buffered optical fiber design of the present invention provides the ability to satisfy the strippability specifications without sacrificing any of the operational performance aspects of the optical fiber and associated communication cable.

In general, the present invention highlights at least three aspects and/or properties of the boundary layer that contribute to this buffered optical fiber design exhibiting superior stripping characteristics as compared to the designs of the known prior art. More specifically, the present invention utilizes a thickness of material for the boundary layer 40 that is significantly larger than the films, lubricants and release agents of the prior art. In this regard, the wall thickness of the boundary layer 40 in accordance with the present invention is designed to be at least about one-twenty-fifth (1/25) of the wall thickness of the buffer 30. In addition to being able to be more consistently and reliably applied than the minimal amounts of films, lubricants and release agents used in the prior art, the thicker boundary layer 40 of the present invention provides additional benefits over the prior art designs including decreasing the thickness required for the buffer layer 30. Secondly, the present invention recognizes that by selecting a relatively low modulus material for the boundary layer 40, operational aspects of the optical fiber are actually enhanced over the prior art teachings. Lastly, the present invention uses a polyolefin or copolymers thereof as the boundary layer material in a manner that allows the adhesion between this boundary layer 40 and the outermost coating layer to be enhanced by incorporating a constituent that has a relatively high polarity, such as an ester. The appropriate amount of ester to be added may be a factor of a combination of at least the modulus of the boundary material used as well as the particular properties of the material used as the buffer layer.

Consistent with the teachings of some prior art, the material used as the boundary layer 40 should not be readily compatible chemically with adjacent materials, so that they do not dissolve in either the coating material or in the buffering material. Such behavior would result in the loss of the interlayer between the coating material and the buffering material.

The boundary layer 40 of a preferred embodiment of the present invention may comprise a modified acrylic material such as an acrylate copolymer material, for example. As alluded to above, one of the desired properties of the material used for the boundary layer 40 in accordance with the present invention is that the modulus of the boundary layer material be less than the modulus of the buffer layer material. Additionally, the boundary layer 40 should be applied in a thickness that truly acts as a separate layer between the outermost coating of the fiber and the buffer layer 30, for example greater than about 0.5 mil. Lastly, from a concern of processability, it is preferable that the material selected as the boundary layer 40 in accordance with the present invention be extrudable at speeds commonly used in the manufacture of optical fibers. More specifically, the preferred method of manufacturing the present invention is to co-extrude the buffer layer 30 on top of the boundary layer 40.

From an operational perspective, the properties of the boundary layer 40 should be such that the material of the boundary layer fails, or separates within itself, when exposed to an external force. However, this desired separation preferably occurs without leaving a residue of boundary layer material behind on the outermost coating layer. In other words, the modulus of the material used for the boundary layer in combination with the particular level of adhesive established between the outermost coating layer and the boundary layer act to insure that the proper separation occurs when the external stripping force is applied.

In general, one of the aspects of the present invention which contributes to achieving the desired stripping is the choice of materials. As presently used throughout the industry, the outermost coating layer is typically some type of ester which therefore has significant polarity. In contrast, the material selected for the boundary layer in accordance with the present invention is preferably a polyolefin or copolymers thereof. These types of materials are selected due to their lack of polarity and thus their unwillingness to adhere tightly to the outermost coating layer. However, it should be noted that depending on the modulus of the boundary layer material, it may be desirable to increase the adhesion which exists between the boundary layer and the outermost coating layer. When this is desired, a small amount by weight percent of an ester may be added to the boundary layer material so as to enhance the adherence. According to the present invention, an ester may be introduced to a level up to about 40% by weight of the boundary layer material.

More specifically, and in accordance with a preferred embodiment of the present invention, the boundary layer 40 is a composition which comprises an acrylate copolymer material available commercially as DPDA-9169 Natural resin modifier from the Union Carbide Chemicals and Plastics Company Inc. DPDA-9169 Natural comprises 18 weight percent of the ethyl acrylate comonomer to impart flexibility and polarity to the polymer and has a base resin of 2-propenoic acid, ethyl ester, and polymer with ethene. Properties of this material are provided in a Material Safety Data Sheet designated POD MSDS 010-06 and in Product Information No. PP 73-10B available from Union Carbide, which are expressly incorporated herein by reference.

As yet another possible aspect of the present invention, the composition of the boundary layer 40 also may include a trace amount, for example about 0.05%, of an optical brightener. Such a constituent is useful during manufacture and in field use, for example, to verify that the buffered optical fiber includes a boundary layer. This is accomplished by exposing a length of the buffered optical fiber 20 to ultraviolet light (UV) energy such as from a UV lamp.

Such a boundary layer 40, properly applied, provides sufficient adhesion to both the coating material and to the buffering material of the buffer layer 30. As a result, a completely unbonded buffer layer such as would result from the use of a release agent is avoided. At the same time, the adhesion is sufficiently low so that structural arrangements are possible where mechanical stripping of covering materials from the fiber may be accomplished readily.

The boundary layer 40 of the present invention is relatively thin as compared to the thickness of the buffer layer 30, but larger than the thickness of the films, lubricants and release agents of the prior art. For example, in a preferred embodiment, the boundary layer 40 has a thickness in the range of 50 µm to 100 µm, as compared to 0.3 µm to 0.5 µm thickness for the decoupling layer of the '260 patent referenced earlier.

The buffered optical fiber 20 which includes the boundary layer 40 overcomes problems of the prior art. As will be recalled, in order to terminate an optical fiber it usually is necessary to remove the buffer layer 30 and the boundary layer 40 from an end portion and more likely than not also to remove the optical fiber coating material from at least a portion of the end portion.

For example, it may be desired to remove about one inch of the buffer layer 30 and the boundary layer 40, and about ⅞ inch of the coating material 23. This may be done, for example, to allow the optical fiber which is bared of the coating material to be inserted into a terminating ferrule. The remaining ⅛ inch of the end portion which still includes coating material is used for strain relief.

Viewing now FIG. 6, it is seen that stripper blades 50—50 along an end portion 52 of a buffered optical fiber are caused to penetrate to a depth comprising the thickness of the buffer layer 30 and the boundary layer 40 plus a sufficient portion of the coating thickness. Then the stripper blades 50—50 are caused to be moved to the right as viewed in FIG. 7. In the initial movement of the stripper blades 50—50 to the right, the buffer layer material of the end portion 52 tears or fractures from the buffer layer and the boundary layer material of the remainder of the buffered optical fiber. The same action occurs with the coating material. The buffer layer 30, the boundary layer 40 and the coating materials then are free to be moved to the right as illustrated.

If the buffer material remains adhered to the coating material, as in some prior art buffered optical fibers, the coating material is compressed inside the buffer layer material, and the increasing volume of coating materials causes the buffer layer material to swell and, in some cases, split. The increased forces on the optical fiber of the end portion 52 caused by the compression of the coating material inside the buffering material during the mechanical stripping process generally are sufficient to cause the fiber to fracture.

When the stripping blades 50—50 are caused to penetrate the buffered optical fiber of this invention and be moved toward the free end of an end portion, the forces exerted on the system are sufficient to cause failure of the low coupling forces that exist between the buffer layer 30 and the coating material 23 because of the disposition of the boundary layer 40. As a result, the buffer layer 30 and the boundary layer 40 are able to move or slide to the right longitudinally along the fiber until fully removed therefrom. A gap forms between the buffer layer on the end portion and the blades 50—50, and the coating material spurts outwardly through the gap.

This behavior appears to be confirmed by the observations that following stripping tests, relatively large mounts of coating material were found in the vicinity of the blades and the buffering material is removed as a tube. On the other hand, in many prior art designs where an inadequate interface layer, if any, is present, relatively large amounts of coating material are sometimes found inside the buffering material which has expanded, in some cases split, and which is not removed from the fiber as a tube.

Afterwards, the stripper blades 50—50 are repositioned ⅛ inch from the end of the buffer layer plastic and caused to penetrate only the buffer layer plastic. Relative motion between the stripper blades 50—50 and the buffered optical fiber with the blades so positioned causes another ⅛ inch of the buffer layer plastic to be removed.

Although the boundary layer 40 of this invention allows the removal of a reasonable length up to about two inches of the buffering and/or coating material in one operation, it also is especially useful when removal of the buffer layer 30 and the boundary 40 down to the glass optical fiber itself is required. In the past, mechanical stripping of the buffering material or buffering material and coating was done in incremental steps. A craftsperson could have gone successfully through a number of steps only to break the fiber during the execution of the last step. Now, the entire end portion may be mechanically stripped with relative ease whether stripping down to the coated optical fiber or removing the coating also to actually expose the glass fiber.

In order to accomplish this for a relatively lengthy end portion, after the stripper blades 50—50 have been moved through the buffer layer 30, the craftsperson assists manually the separation of the buffer layer on the end portion 52 from the remainder of the buffered optical fiber 20. The craftsperson grasps the buffer layer 30 on the end portion 52 and urges it toward the free end of the end portion. This is done because it would be difficult to cause the movement of the blades to cause the adhesion between the buffer layer and the underlying coating to fracture all the way to the end of the buffered fiber. Instead, manual assist is provided to remove the buffer layer. Afterwards, stripper blades are caused to penetrate the coating material and are moved to remove the coating material from the end portion.

It is important to recognize the versatility that the buffered optical fiber of this invention provides for the craftsperson and the designer. Almost any expected reasonable length may be stripped. Further, any combination of buffering material and coating material or buffering material alone may be removed as demanded to carry out a particular design termination.

The optical fiber cable of this invention is advantageous from the standpoint of connectorization. It may be terminated with a biconic connector which is disclosed in priorly mentioned U.S. Pat. No. 4,512,630. Also, it may be terminated by an ST® connector disclosed in priorly mentioned U.S. Pat. Nos. 4,850,670, 4,896,938, 4,934,785 and 5,129,023, as well as many other types of optical fiber convertors such as the FC® and/or SC®.

The buffered optical fiber 20 of this invention also may be used to provide a multifiber cable. Such a cable may include a strength member system which may be metallic, for example, and which may be enclosed in a plastic material or which may include yarn such as KEVLAR® yarn, for example. Arranged within a core may be a plurality of the buffered optical fibers 20—20. The plurality of buffered optical fiber 20—20 are enclosed by a jacket which is made of a plastic material. For connectorization, a portion of the jacket is removed and each of the buffered single fibers which thus becomes exposed is stripped and terminated with a connector. The biconic, ST® and/or FC/SC® type connectors may be used to terminate each of the buffered optical fibers of the cable.

It is to be understood that the above-described arrangements are simply illustrative of the invention. Other arrangements may be devised by those skilled in the art which will embody the principles of the invention and fall within the spirit and scope thereof.

We claim:

1. A buffered optical fiber, which comprises:
   an optical fiber with at least one layer of a coating material thereon;
   a plastic buffering material which encloses said optical fiber and said at least one coating layer; and
   a boundary layer which is interposed between the outermost of said at least one coating layer and said buffering material, wherein said boundary layer has a wall thickness greater than at least about one-twenty-fifth of the wall thickness of the layer of buffering material.

2. The buffered optical fiber of claim 1, wherein the wall thickness of said boundary layer is greater than about 0.5 mils.

3. The buffered optical fiber of claim 1, wherein said boundary layer comprises a polyolefin or copolymers thereof.

4. The buffered optical fiber of claim 1, wherein said boundary layer has a modulus less than about 15,000 psi at 23° C. (Secant Modulus).

5. The buffered optical fiber of claim 1, wherein said boundary layer may be extruded onto the outermost coating layer.

6. The buffered optical fiber of claim 1, wherein said boundary layer and the plastic buffering material may be co-extruded onto the outermost coating layer.

7. The buffered optical fiber of claim 1, wherein said plastic buffering material may be removed without removing said at least one layer of coating material.

8. The buffered optical fiber of claim 1, wherein the removal of said plastic buffering material may be accomplished without damaging said at least one layer of coating material.

9. The buffered optical fiber of claim 1, wherein said plastic buffering material may be removed together with said at least one layer of coating material.

10. The buffered optical fiber of claim 1, wherein said boundary layer being such that there is insignificant if any migration of said boundary layer into said coating material on said optical fiber or into said plastic buffering material thereby facilitating the removal of said plastic buffering material from said optical fiber.

11. The buffered optical fiber of claim 1, wherein said boundary layer comprises a copolymer of ethylene and ethyl acrylate.

12. The buffered optical fiber of claim 1, wherein said boundary layer includes about 0.05% by weight of an optical brightener material.

13. An optical fiber communications cable, which comprises:
    at least one optical fiber each with at least one layer of a coating material thereon;
    a plastic buffering material which encloses said optical fiber and said at least one coating layer;
    a boundary layer which is interposed between the outermost of said at least one coating layer and said buffering material, wherein said boundary layer has a wall thickness greater than at least about one-twenty-fifth of the wall thickness of the layer of buffering material;
    a sheath system surrounding the coated, buffered optical fiber and boundary layer.

14. The optical fiber cable of claim 13, wherein said boundary layer has a modulus less than about 15,000 psi at 23° C. (Secant Modulus).

15. The optical fiber cable of claim 13, wherein said boundary layer may be extruded onto the outermost coating layer.

* * * * *